United States Patent
Genc et al.

(10) Patent No.: US 6,410,176 B1
(45) Date of Patent: Jun. 25, 2002

(54) VOLTAGE MONITORING SYSTEM FOR A FUEL CELL STACK

(75) Inventors: Suat Genc, Troy; Larry A. Pitts, Averill Park; Kevin L. Mease, Latham; Charles M. Carlstrom, Saratoga Springs, all of NY (US); Russel H. Marvin, Goshen, CT (US)

(73) Assignee: Plug Power, Inc., Latham, NY (US)

( * ) Notice: Subject to any disclaimer, the term of this patent is extended or adjusted under 35 U.S.C. 154(b) by 160 days.

(21) Appl. No.: 09/629,548

(22) Filed: Jul. 31, 2000

(51) Int. Cl.[7] ................................................. H01M 8/00
(52) U.S. Cl. .............................. 429/13; 429/12; 429/23
(58) Field of Search ................................ 429/13, 12, 23

(56) References Cited

U.S. PATENT DOCUMENTS 6,129,895 A * 10/2000 Edmondson
6,165,632 A * 12/2000 Blum et al. .................... 429/12
6,281,684 B1 * 8/2001 James

* cited by examiner

*Primary Examiner*—John S. Maples
(74) *Attorney, Agent, or Firm*—Trop, Pruner & Hu, P.C.

(57) ABSTRACT

An assembly includes a fuel cell stack, a circuit board, an elastomeric connector and a frame. The elastomeric connector contacts the stack to provide cell voltages of the stack to the circuit board. The frame holds the circuit board, positions the elastomeric connector between the fuel cell stack and the circuit board and provides the appropriate compression of the connector.

50 Claims, 11 Drawing Sheets

VOLTAGE MONITORING SYSTEM FOR A FUEL CELL STACK

BACKGROUND

The invention relates to a voltage monitoring system for a fuel cell stack.

A fuel cell is an electrochemical device that converts chemical energy produced by a reaction directly into electrical energy. For example, one type of fuel cell includes a proton exchange membrane (PEM), often called a polymer electrolyte membrane, that permits only protons to pass between an anode and a cathode of the fuel cell. At the anode, diatomic hydrogen (a fuel) is reacted to produce hydrogen protons that pass through the PEM. The electrons produced by this reaction travel through circuitry that is external to the fuel cell to form an electrical current. At the cathode, oxygen is reduced and reacts with the hydrogen protons to form water. The anodic and cathodic reactions are described by the following equations:

$H_2 \rightarrow 2H^+ + 2e^-$ at the anode of the cell, and $O_2 + 4H^+ + 4e^- \rightarrow 2H_2O$ at the cathode of the cell.

A typical fuel cell has a terminal voltage near one volt DC. For purposes of producing much larger voltages, several fuel cells may be assembled together to form a fuel cell stack, an arrangement in which the fuel cells are electrically coupled together in series to form a larger DC voltage (a voltage near 100 volts DC, for example) and to provide more power.

The fuel cell stack may include flow plates (graphite composite or metal plates, as examples) that are stacked one on top of the other, and each plate may be associated with more than one fuel cell of the stack. The plates may include various surface flow channels and orifices to, as examples, route the reactants and products through the fuel cell stack. Several PEMs (each one being associated with a particular fuel cell) may be dispersed throughout the stack between the anodes and cathodes of the different fuel cells.

The health of a fuel cell stack may be determined by monitoring the individual differential terminal voltages (herein called cell voltages) of the fuel cells. In this manner, a particular cell voltage may vary under load conditions and cell health over a range from −1 volt to +1 volt. For purposes of monitoring the cell voltages, wires may be attached to the flow plates and extend to a circuit board that includes circuitry for scanning the cell voltages. In this manner, each cell is associated with two wires: a first wire that is attached to a flow plate associated with the cathode of the cell and a second wire that is attached to another flow plate that is associated with the anode of the cell. Therefore, a fuel cell stack may have a considerable number of wires extending from the stack to the circuit board. Such an arrangement increases the time to manufacture the fuel cell stack, as a connection must be formed between the end of each wire and a particular flow plate. Each stack-to wire connection is also subject to failure, and thus, the above-described arrangement may have reliability problems. Furthermore, the above-described arrangement may increase the overall size of the assembly.

Thus, there is a continuing need for an arrangement that addresses one or more of the problems that are stated above.

SUMMARY

In an embodiment of the invention, an assembly includes a fuel cell stack, a substrate (a printed circuit board or a flexible circuit, as examples) that supports electrical contacts and an electrical bridge (an elastomeric connector, for example). The fuel cell stack provides cell voltages, and the bridge provides indications of the cell voltages to the electrical contacts. The clamp holds the electrical bridge in compression against the fuel cell stack to communicate indications of the cell voltages to the electrical contacts.

In another embodiment of the invention, an assembly includes a fuel cell stack, a circuit board, an elastomeric connector and a frame. The elastomeric connector contacts the stack to provide cell voltages of the stack to the circuit board. The frame holds the circuit board and positions the elastomeric connector between the fuel cell stack and the circuit board.

Advantages and other features of the invention will become apparent from the following description, from the drawing and from the claims.

DETAILED DESCRIPTION

Figure 1:
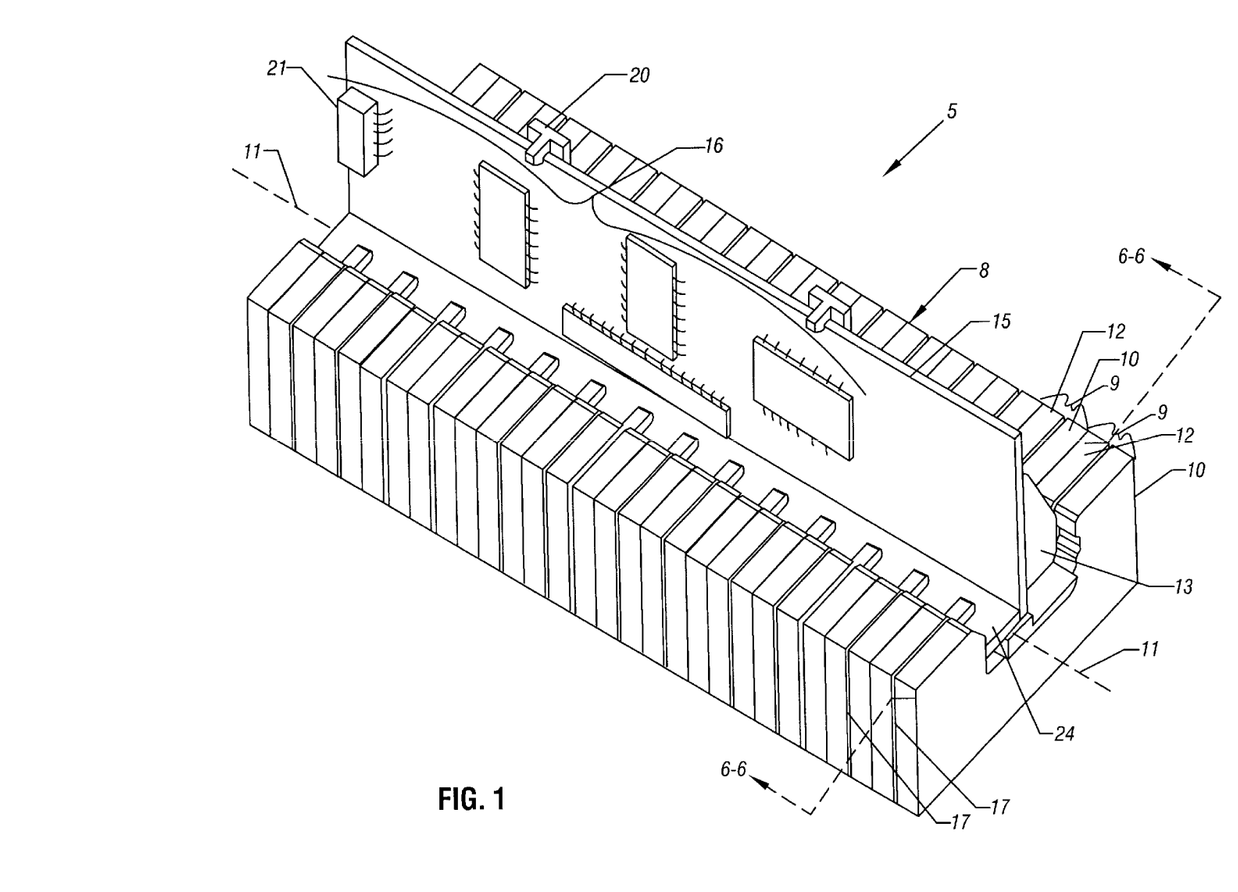
FIG. 1 is a front perspective view of a fuel cell stack assembly according to an embodiment of the invention.

Referring to FIG. 1, an embodiment 5 of a fuel cell stack assembly in accordance with the invention includes a fuel cell stack 8 that consumes reactants (oxygen and hydrogen) to produce power for a load. The fuel cell stack 8 may produce power for a house, for example. For purposes of monitoring the fuel cells of the stack 8, voltage monitoring circuitry may be used to scan cell voltages of the stack 8. To accomplish this, the assembly 5 may include a circuit board 15 (a printed circuit board, for example) on which is formed circuitry 16 that is used to scan the voltages of the fuel cells. The circuitry 16 may or may not, depending on the particular embodiment, form all of the voltage monitoring circuitry. However, the circuitry 16 forms at least the portion of the voltage monitoring circuitry that receives indications of the cell voltages, as described below. The circuitry 16 may include a connector 21 to connect the circuit board 15 to another circuit board that is associated with another group of flow plates; to provide indications of the scanned voltages to circuitry not on the circuit board 15; and/or to provide indications of the results of the scanning. A possible embodiment of the voltage monitoring circuitry 16 is described in U.S. Pat. No. 6,140,820, entitled, "MEASURING CELL VOLTAGES OF A FUEL CELL STACK," filed on Dec. 27, 1999.

More specifically, the assembly 5 includes an electrical bridge, such as an elastomeric connector 24, that is sandwiched between the circuit board 15 and the stack 8 to provide indications of cell voltages to electrical contacts (not shown in FIG. 1) of the circuitry 16. As its name implies, the elastomeric connector 24 is compressible and flexible, characteristics that permit the connector 24 to be slightly compressed to form solid electrical contacts between the stack 8 and the circuit board 15. The connector 24 may be marketed under the mark Zebra® and may be made by Fujipoly America, for example. The connector 24 may also be available from other manufacturers, such as Shin-Etsu Polymer Co., Ltd., as another example.

Figure 8:
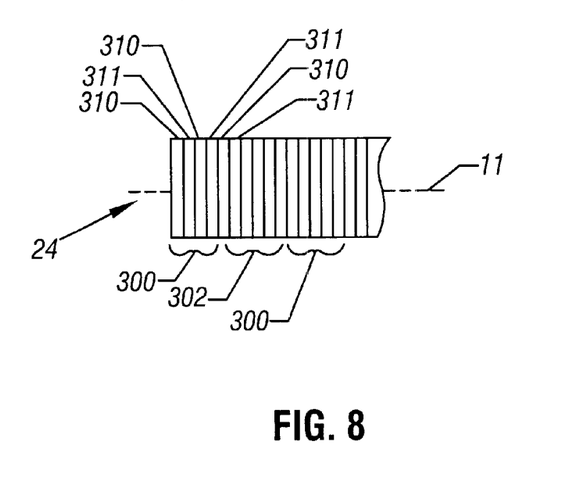
FIG. 8 is a side view of a portion of an elastomeric connector according to an embodiment of the invention.

Referring also to FIG. 8, the connector 24 is made from a flexible material, such as silicone rubber (for example), that has conductive 310 layers that are interleaved with non-conductive 311 layers (of the connector 24) along a longitudinal axis 11 (see also FIG. 1) of the connector 24. In some embodiments of the invention, a distance (set by the pitch of the connector 24) between nearest conductive layers 310 is such that several conductive layers 310 of the connector 24 contacts one flow plate of each cell, and the flow plate or plates in between do not contact the connector 24. Therefore, the contact pattern that the flow plates establish with the connector 24 groups the layers 310 and 311 into groups 300 that contact an associated flow plate and groups 302 (one group 302 is depicted in FIG. 8) that do not contact a flow plate. The pitch of the connector 24 determines the number of conductive layers 310 that contact a particular flow plate. Depending on the particular embodiment of the invention, the pitch of the connector 24 is such that the conductive layers 310 may have a density between approximately 100 to 500 conductive layers per inch along the axis 11, as an example.

Figure 9:
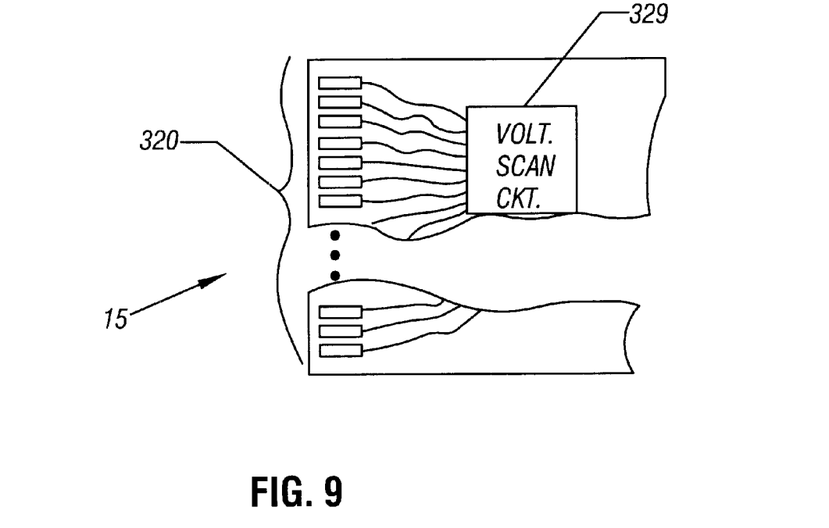
FIG. 9 is a view of a portion of a circuit board of the assembly according to an embodiment of the invention.

Referring to FIG. 9, because the conductive layers 310 extend to the edge, or face, of the connector 24 opposite from edge that contacts the flow plates, the groups 300 and 302 contact electrical contacts, or plates 320, of the circuit board 15 to electrically couple the conductive plates 320 to the flow plates of the stack 8. In some embodiments of the invention, each conductive plate 320 indicates the voltage of a particular fuel cell terminal, or node, of the stack 8. As an example, besides the conductive plates 320, the circuitry 16 of the circuit board 15 may also include a voltage scanning circuit 329 that is coupled to the conductive plates 320 to monitor the cell voltages of the stack 8.

Referring back to FIG. 1, in some embodiments of the invention, each fuel cell is formed from a repeating unit 9 (only two units 9 are labeled in FIG. 1) of two flow plates 10 and 12 and a membrane 17 (a PEM, for example) that is sandwiched in between the flow plates 10 and 12 of the unit 9. The flow plates 10 contact the connector 24, and the flow plates 12 do not contact the connector 24. Thus, each flow plate 10 provides an indication of the voltage of one of the nodes of the stack 8 to the connector 24 that, in turn, provides the indication to the circuitry 16 of the circuit board 15.

For purposes of mounting the connector 24 between the stack 8 and the circuit board 15, in some embodiments of the invention, the assembly 5 includes a clamp, such as a frame 20, that holds the board 15 and the connector 24 to form a subassembly for insertion into a generally U-shaped channel 13 of the stack 8. Alternatively, instead of a frame, another type of clamp, such as a band or a strap may secure the board 15 to the stack 8. Furthermore, in some embodiments of the invention, the frame may attach to the stack 8 without being inserted into the channel. Other variations are possible.

For embodiments that use the frame 20, once the subassembly is inserted into the channel 13, the flow plates 10 compress the connector 24 against the board 15 to establish sufficient contact between the connector 24 and the board 15 and establish sufficient contact between the connector 24 and the flow plates 10. In some embodiments of the invention, the connector 24 is compressed between 5% to 25% (as an exemplary range that may depend on the requirements imposed by the manufacturer of the connector 24) when the subassembly is mounted inside the channel 13, a compression that may be needed to activate the connector 24.

Figure 2:
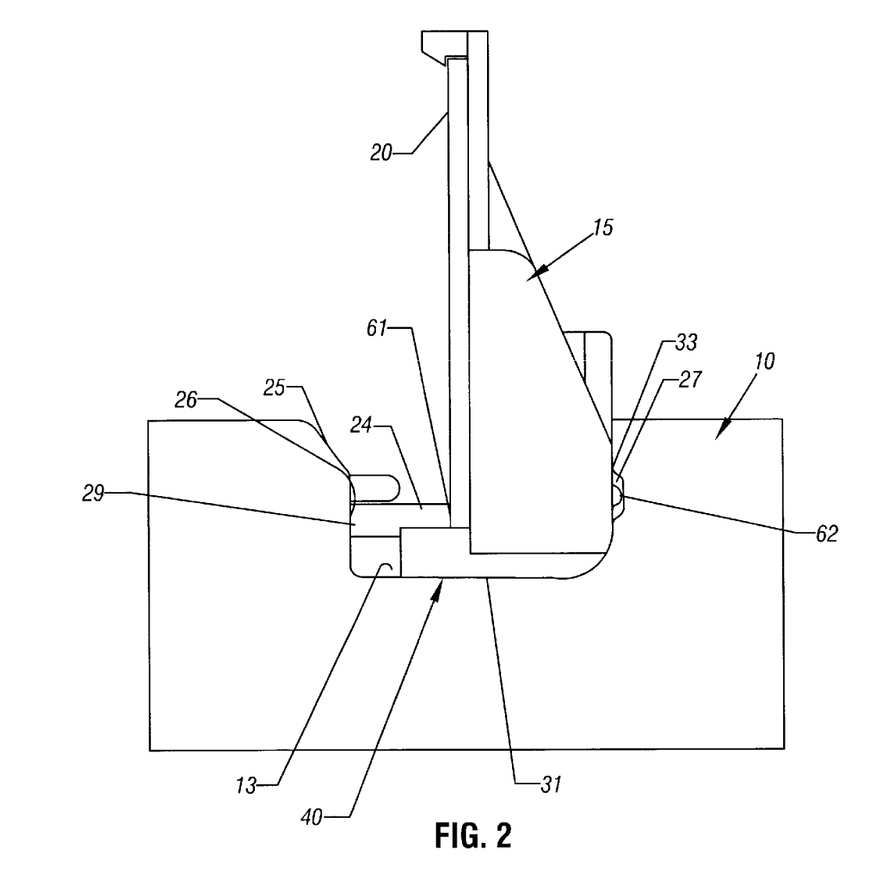
FIG. 2 is a right side view of the assembly of FIG. 1 according to an embodiment of the invention.

Referring to a right side view of the stack 8 that is depicted in FIG. 2, the flow plate 10 has an approximate U-shaped cut-out portion 40 to form part of the channel 13 that receives the subassembly of the frame 20, board 15 and connector 24. When this subassembly is inserted into the channel 13, an edge 29 of the connector 24 contacts a vertical edge 26 of the flow plate 10, thereby making electrical contact with the flow plate 10. Another edge 61 of the connector 24 contacts the circuitry 16 of the circuit board 15. Both edges 29 and 61 are parallel and extend along the longitudinal axis 11 (see FIG. 1) of the connector 24. The vertical edge 26 of the flow plate 10 forms part of the side wall of the channel 13. Near the top of the U-shaped cut out portion 40, the vertical edge 26 transitions into a beveled edge 25 that facilitates insertion of the frame 20, board 15 and connector 24 subassembly into the channel 13. In this manner, when this subassembly is inserted into the channel 13, the beveled edge 25 both guides the connector 24 into the channel 13 and aids in compressing the connector 24 as the subassembly is inserted into the channel 13.

A bottom edge 31 (of the flow plate 10) that borders the bottom of the cut-out section 40 forms part of the bottom of the channel 13, and a vertical edge 33 (of the flow plate 10) that borders the right side of the cut-out section 40 forms part of the other vertical sidewall of the channel 13. In some embodiments of the invention, a recess 27 is formed in the vertical edge 33 to form part of a channel for receiving a detent rib 62 of the frame 20 for purposes of locking the frame 20 into place, as described below.

Figure 3:
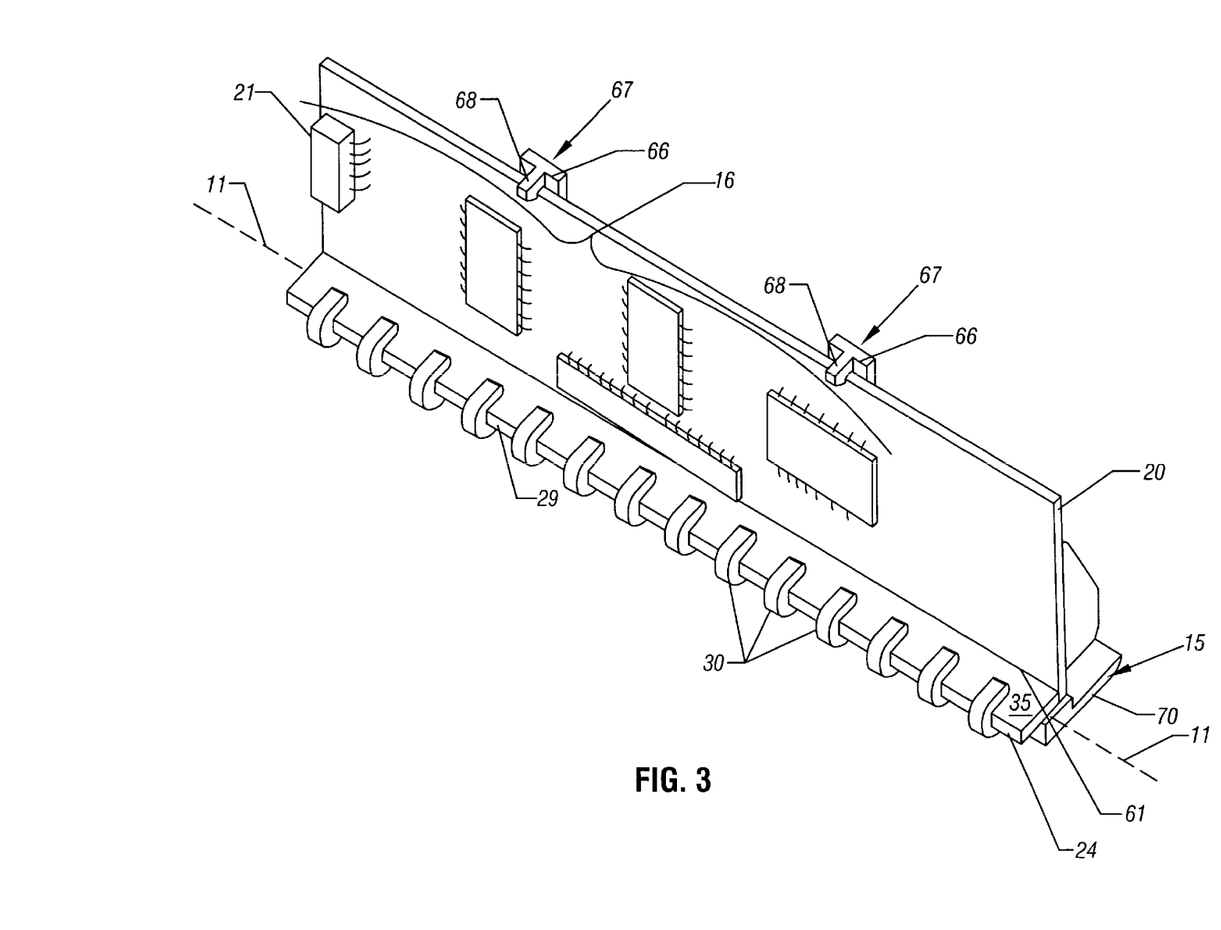
FIG. 3 is a front perspective view of a frame, circuit board and elastomeric connector subassembly of the assembly of FIG. 1 according to an embodiment of the invention.

Referring to FIG. 3, in some embodiments of the invention, the frame 20 includes hook-shaped fingers 30 that hold the connector 24. The fingers 30 are curved to extend from the underside of the connector 24 around the edge 29 and partially over an upper surface 35 of the connector 24. The fingers 30 are regularly spaced apart to permit the flow plates 10 to contact the surface 29, as depicted in FIG. 2.

The frame 20 holds the board 15 so that the edge 61 of the connector 24 contacts the face of the circuit board 15. The frame 20 includes two upwardly extending tabs 70 (one tab 70 being shown in FIG. 3) that are located on the opposite ends of the connector 24 to constrain movement of the connector 24 and the board 15.

The subassembly of the board 15, frame 20 and connector 24 may be assembled together in the following fashion. First, the board 15 is inserted into the frame 20. In some embodiments of the invention, the board 15 may be secured to the frame 20 via one or more fasteners (screws, for example) or an adhesive. In some embodiments of the invention, the frame 20 forms a snap fit with the board 15 to secure the board 15 to the frame 20 without the use of a fastener or an adhesive. Next in the assembly, the connector 24 is flexed to slide into the fingers 30. This subassembly may then be inserted into the channel 13. When inserted into the channel 13, the flow plates 10 compress the connector 24 between the flow plates 10 and the board 15.

Figure 4:
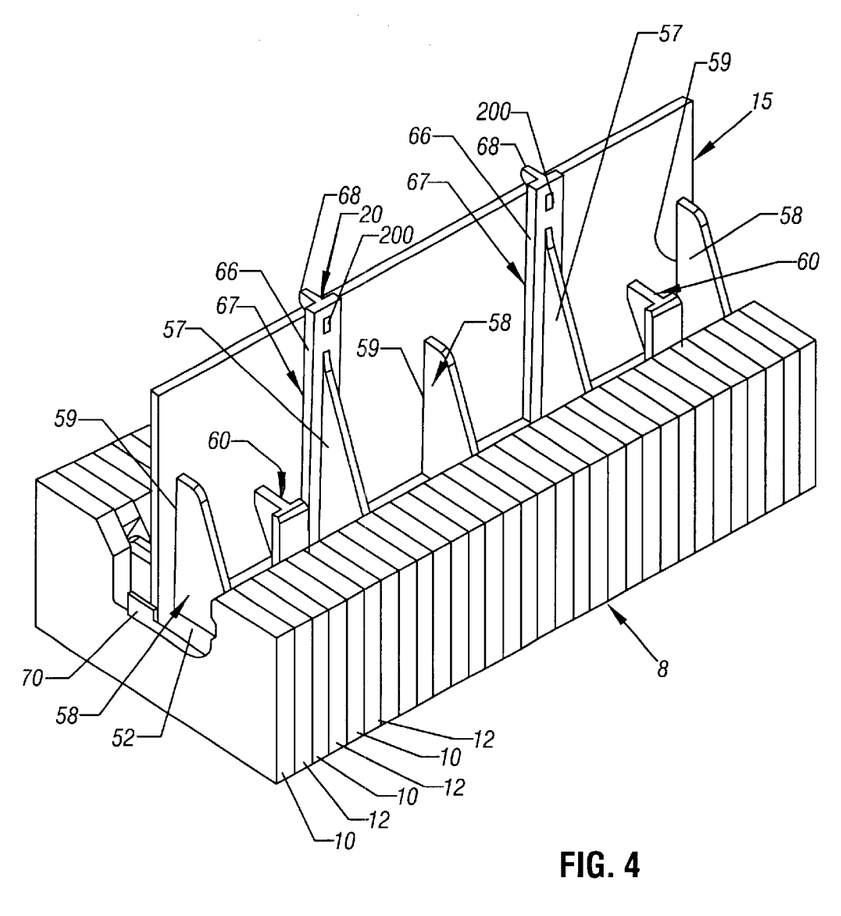
FIG. 4 is a rear perspective view of the assembly according to an embodiment of the invention.

Referring to FIG. 4, in some embodiments of the invention, the frame 20 includes a substantially flat base portion 52 that lies flat in the bottom portion of the U-shaped channel 13. The frame 20 also includes support members 58 and 67 that extend upwardly from the base portion 52 to support the circuit board 15. In this manner, the support members 58 may be support ribs that extend upwardly from the base portion 52 and include vertical edges 59 to support the board 15. The support members 58 are sized to compress the board 15 against the connector 24 by the percentage noted above when the subassembly of the board 15, frame 20 and connector 24 is inserted into the channel 13. Each support member 67 includes a flat extension 66 that extends upwardly from the base portion 52 to support the board 15 on the extension's flat surface.

The support member 67 also includes an overhanging clip 68 that is located on the top of the extension 66. The clip 68 extends over the top edge of the circuit board 15 to form a snap fit with the board 15 to secure the board 15 to the frame 20, as depicted in FIG. 3. In some embodiments of the invention, the extension 66 is made wide enough to accommodate an opening 200 that is formed in the extension 66 for purposes of permitting injection molding of the overhanging clip 68 when injection molding is used to form the frame 20. Each support member 67 may also include a support rib 57 that rises from the base portion 52 to support the extension 66. The support rib 57 is sized to compress the board 15 against the connector 24 by the percentage noted above when the subassembly of the board 15, frame 20 and connector 24 is inserted into the channel 13.

Figure 5:
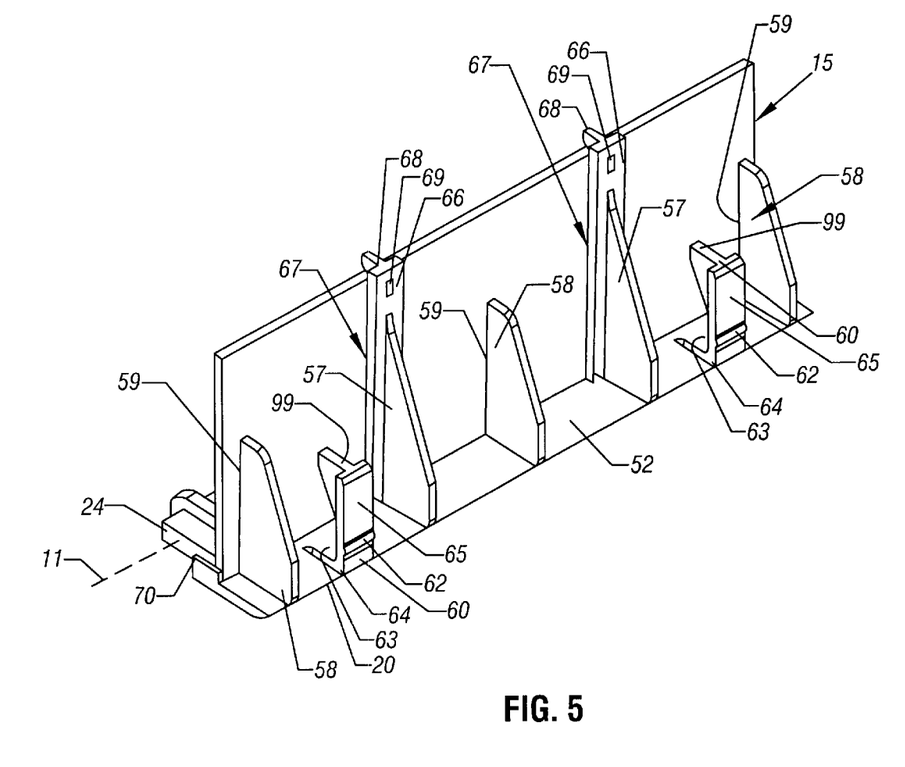
FIG. 5 is a rear perspective view of the frame, circuit board and elastomeric connector subassembly of FIG. 3 according to an embodiment of the invention.

Referring to FIG. 5, the frame 20 may also include flexible and generally L-shaped snap-fit latch members 60 for purposes of releasably locking the frame 20 inside the channel 13. In this manner, each member 60 may include a bottom portion 63 that resides inside a notch of the base portion 52 of the frame 20, is connected to the base portion 52 and generally lies in the same plane as the base portion 52. The bottom portion 63 transitions into a 90° curved portion 64 that transitions into an upwardly extending portion 65. Due to this design, the member 60 is substantially resilient when flexed toward the board 15.

Each member 60 includes a catch 62 that extends in a direction that is parallel to the longitudinal axis 11. The catch 62 slips into a detent channel of the stack 8 when the frame 20 is inserted into the channel 13. The detent channel is formed by the corresponding recessed regions 27 of the flow plates 10 (see FIG. 2) and recessed regions 21 of the flow plates 12 (see FIG. 6). Thus, when the frame 20 is inserted into the channel 13, the upstanding portion 63 of the member 60 is flexed away from the sidewall of the channel 13 toward the board 15 until the catch 62 slips into the detent channel. In some embodiments of the invention, each member 60 may also include an extension 99 that extends orthogonally from the upstanding portion 63 toward the board 15 to limit deflection of the member 60.

Figure 6:
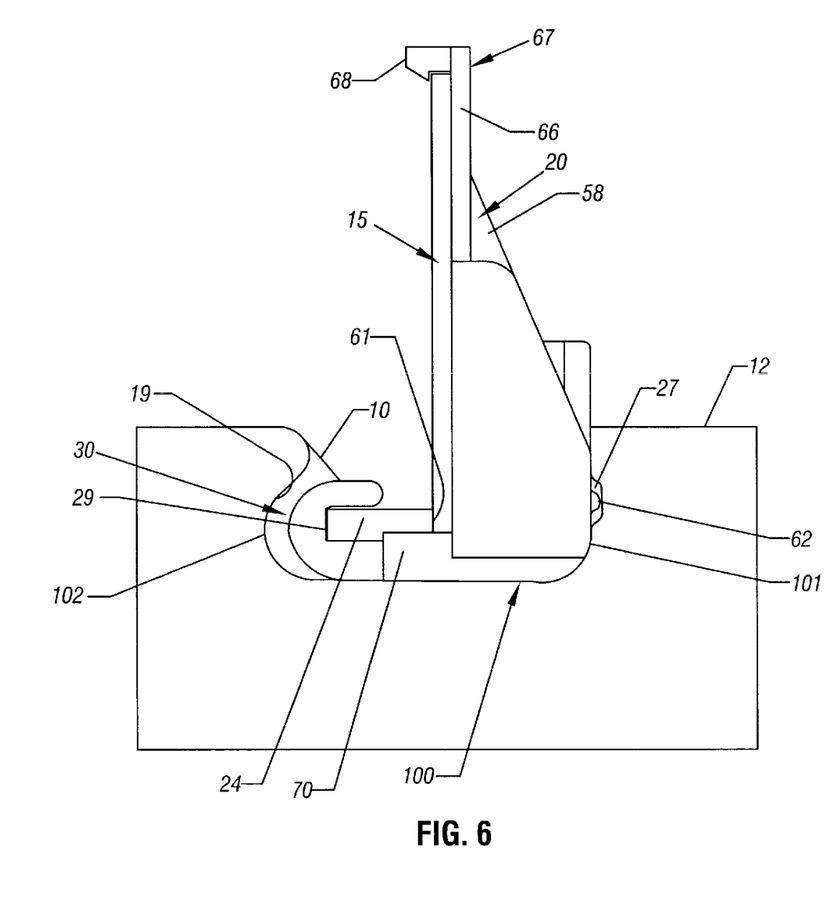
FIG. 6 is a cross-sectional view of the assembly of FIG. 1 according to an embodiment of the invention taken along line 6—6 of FIG. 1.

Referring to a cross-section of the stack 8 that is depicted in FIG. 6, each flow plate 12 has a generally U-shaped cut-out portion 100 to form part of the channel 13. The right edge 101 that borders the portion 100 includes the recessed portion 21 to receive the detent rib 62, and the left edge 102 that borders the portion 100 includes a recessed region 19 that receives one of the fingers 30 of the frame 20. Therefore, due to this arrangement, the edge 29 of the elastomer connector 24 is not contacted by the flow plates 12, but is contacted and compressed by the fingers 30 of the flow plates 10. The recessed region 19 is curved to permit the finger 30 to contact the curved surface that defines the region 19 and pivot during insertion of the frame 20 into the channel 13. As depicted in FIG. 6, after the frame 20 is seated in the channel 13, the finger 30 does not contact the curved surface that defines the region 19.

Figure 7:
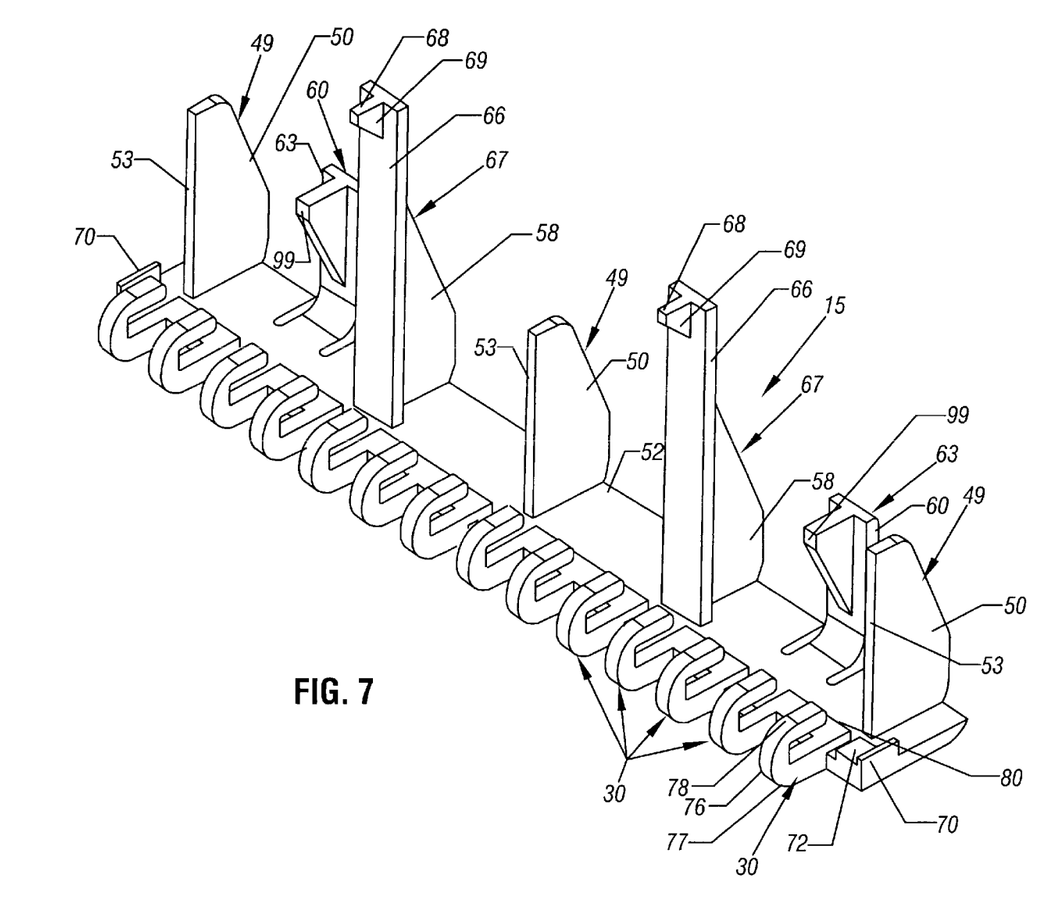
FIG. 7 is a front perspective view of the frame according to an embodiment of the invention.

Referring to FIG. 7, in some embodiments of the invention, each finger 30 may include a flat lower portion 77 that supports the lower surface of the connector 24 and a flat upper portion 78 that rests on the upper surface of the connector 24 to secure the connector 24 to the frame 20. The finger 30 also includes a curved portion 76 that extends around the edge 29 of the connector 24 and bridges the upper 78 and lower 77 portions together. As depicted in FIG. 7, in some embodiments of the invention, the frame may include a raised surface 72 that lies in substantially the same plane as the upper surfaces of the lower portions 77 of the fingers 30 to ensure that the connector 24 makes contact with the conductive plates 320 (see FIG. 9) of the board 15 above the edge of the board 15. This ensures efficient contact between the connector 24 and the plates 320, as the plates 320 may not extend to the end of the board 15 due to manufacturing tolerances. The raised surface 72 also creates a groove that receives the bottom edge of the board 15 to restrain the board's movement during assembly of the board 15, frame 20 and connector 24.

In some embodiments of the invention, the frame 20 may be a one piece design that is formed from injection molding, for example. However, other variations are possible. For example, the frame 20 may be made from several injection molded parts that are secured together via an adhesive, for example. The frame 20 may be or may not be made by injection molding, in some embodiments of the invention. In some embodiments, the frame 20 may be made from a flexible material, such as a plastic. Other materials may be used.

Figure 10:
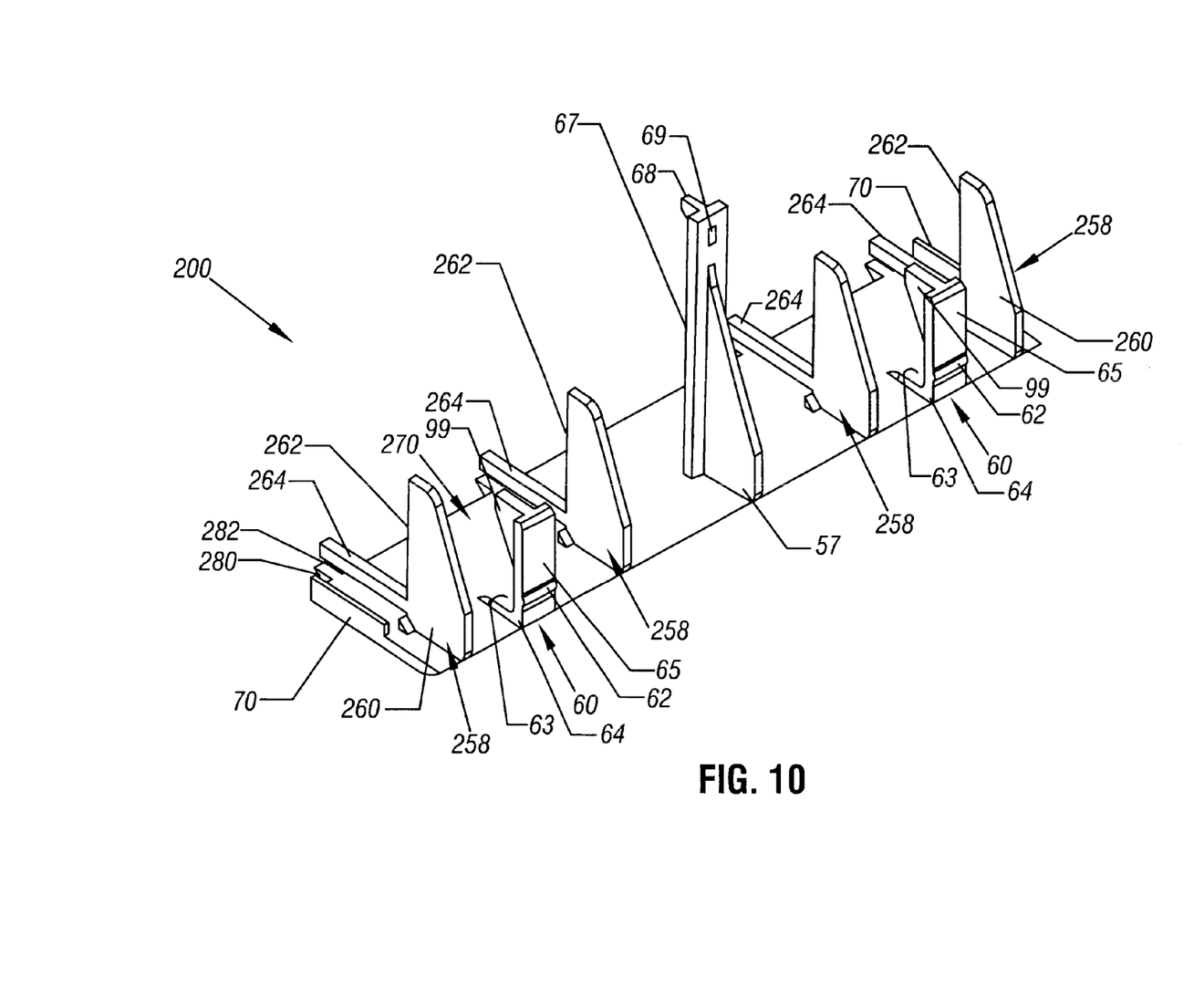
FIG. 10 is a rear perspective view of a frame according to another embodiment of the invention.
Figure 11:
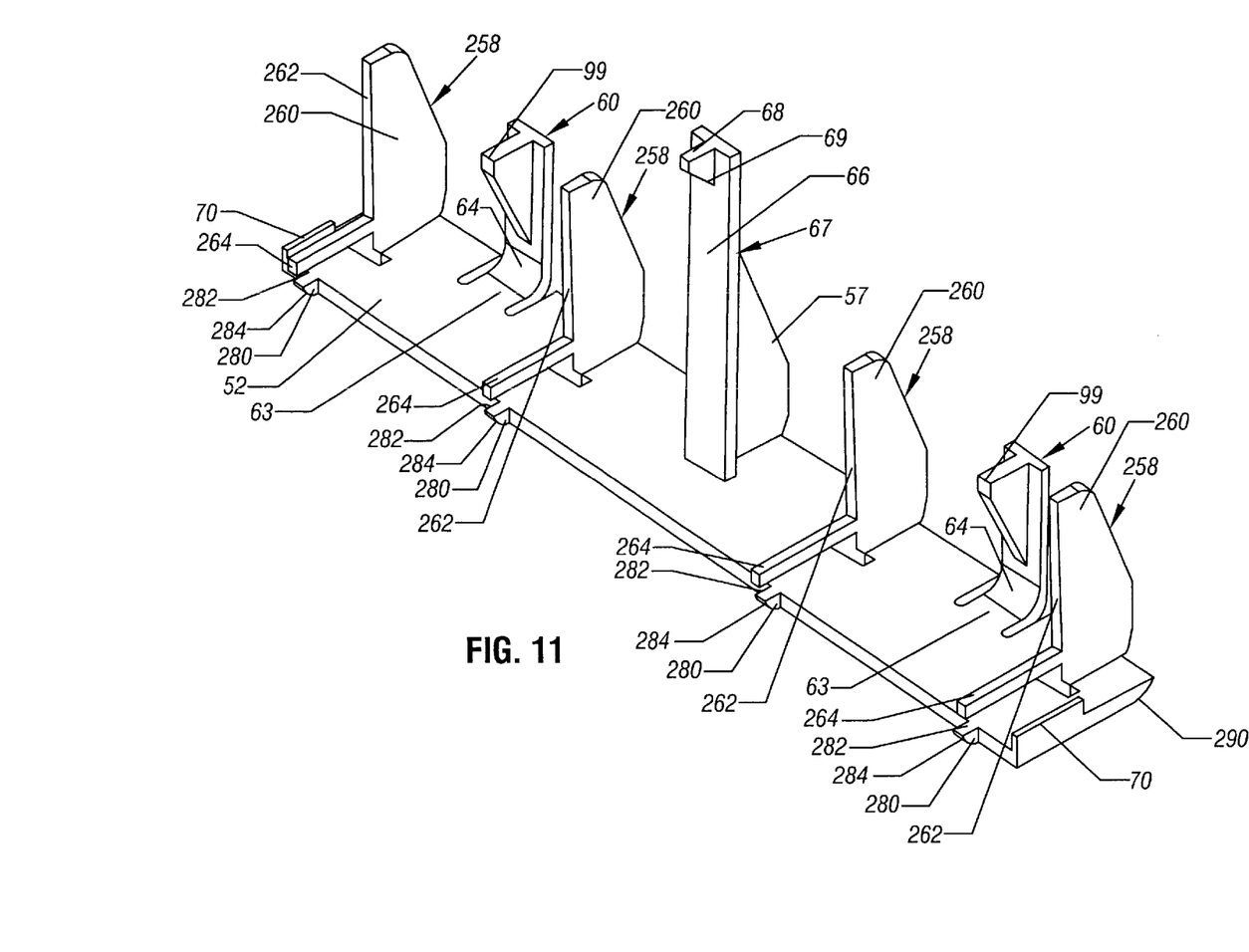
FIG. 11 is a front perspective view of the frame of FIG. 10 according to another embodiment of the invention.
Figure 12:
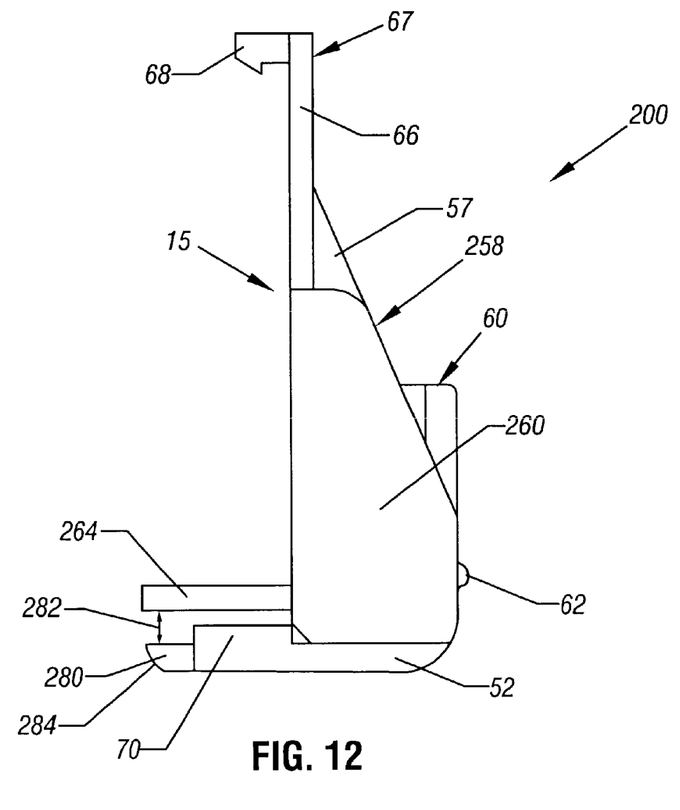
FIG. 12 is a side view of the frame of FIG. 10 according to another embodiment of the invention.

Referring to FIGS. 10, 11 and 12, in some embodiments of the invention, the frame 20 may be replaced by the frame 200. The frame 200 has similar features to the frame 20, with the differences being pointed out below. In particular, the frame 200 has a single support member 67 instead of two support members 67. The three support members 58 are replaced by four support members 258. Like the support member 58, each support member 258 has a rib 260 that has an edge 262 for supporting the circuit board 15, and each rib 260 is sized to compress the connector 24 when the connector 24 is inserted into the channel 13. However, unlike the support member 58 each member 258 includes a prong 264 that extends over the connector 24 (not shown in FIGS. 10, 11 and 12) to hold the connector to the base portion 52 of the frame 200.

In this manner, a gap 282 (see FIG. 12) exists between the prong 264 and the base portion 52. The gap 282 is slightly more narrow than the thickness of the connector 24 before the connector 24 is inserted into the gap 282. However, the prong 264 is sufficiently resilient to bend to permit insertion of the connector 24 between the base portion 52 and the prong 264 to clip the connector 24 to the frame 200. For each prong 264, the base portion 52 may also include a short prong 280 that is parallel to the prong 264 and extends from the base portion 52 underneath the connector 24. The bottom edge 284 of the prong 264 is curved to facilitate insertion of the frame 20 into the channel 13. Thus, unlike the frame 20, the frame 200 does not have the fingers 30. The flow plates 12 (see FIG. 6) have the curved edge 102 that preventing the flow plates 12 from contacting the connector 24.

Other embodiments are within the scope of the claims. For example, the stack 8 may be only part of a larger of stack of flow plates, and several of the frame, board and connector assemblies may be attached to this larger stack. As an example, the circuit boards may be attached together via electrical connectors, such as the connector 21 (see FIG. 1), for example. In some embodiments of the invention, instead of holding just one circuit board, the frame may hold multiple circuit boards that may be electrically connected together. In some embodiments of the invention, the frame may hold multiple elastomeric connectors that are abutting each other end to end. In some embodiments of the invention, a single circuit board and/or elastomeric connector may be held by multiple frames. Other variations are possible.

As another example of another embodiment of the invention, the circuit board 15 is depicted in the figures as being a printed circuit board, a circuit assembly that includes a rigid substrate that supports one or more conductive layers that include the conductive plates 320. However, the circuit board 15 may be replaced by a flexible circuit, also called a "flex circuit." A flexible circuit is a name given to a circuit assembly that has a substantially more flexible substrate that supports its circuitry, as compared to the printed circuit board. The flexible circuit may bend and flex by ninety degrees or more, as an example. Flexible circuits typically connect to moving parts, such as printer heads, for example. The manufacturers of flexible circuits include, as examples, Poly-Flex Circuits, Inc., of Cranston, R.I. and Century Circuits and Electronics, Inc. in St. Paul, Minn. Thus, the circuitry of the flexible circuit also has conductive plates to contact the elastomeric connector 24.

In the preceding description, orientation terms, such as "left," "right," "front," "rear," "side," "upward," "vertical," etc., may have been used for reasons of convenience to describe the assembly 5 and its components. However, such orientations are not needed to practice the invention, and thus, other orientations are possible in other embodiments of the invention.

While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of the invention.

What is claimed is:

1. An assembly comprising:
    a fuel cell stack to provide cell voltages;
    a substrate supporting electrical contacts;
    an electrical bridge to provide indications of the cell voltages to the electrical contacts; and
    a clamp to hold the electrical bridge in compression against the fuel cell stack to communicate indications of the cell voltages to the electrical contacts.
2. The assembly of claim 1, wherein the electrical bridge comprises:
    an elastomeric connector.
3. The assembly of claim 1, wherein the bridge is not directly connected to the substrate.
4. The assembly of claim 1, wherein the clamp holds the bridge in compression against the electrical contacts.
5. The assembly of claim 1, wherein the substrate and electrical contacts comprise a printed circuit board.
6. The assembly of claim 1, wherein the substrate and electrical contacts comprise a flexible circuit substrate.
7. The assembly of claim 1, wherein the clamp comprises:
    a frame to hold the circuit board and position the bridge between the fuel cell stack and the substrate.
8. The assembly of claim 7, wherein the frame holds the bridge.
9. The assembly of claim 7, wherein the fuel cell stack comprises: flow plates to hold the frame.
10. The assembly of claim 9, wherein the flow plates are adapted to form a channel to receive the frame.
11. The assembly of claim 7, wherein
    the fuel cell stack comprises flow plates,
    the flow plates being associated with different fuel cells of the stack, and
    the frame is adapted to cause the bridge to contact at least one flow plate associated with each cell and not contact at least one flow plate associated with each cell.
12. The assembly of claim 11, wherein
    each different fuel cell is associated with a different pair of the flow plates, and
    the frame is adapted to cause the bridge to, for each fuel cell, contact one of the pair and not contact the other of the pair.
13. The assembly of claim 7, wherein the frame comprises:
    fingers to extend at least partially around the bridge to hold the bridge.
14. The assembly of claim 13, wherein the fingers form a raised surface to support the bridge to form a groove for receiving the substrate.
15. The assembly of claim 13, wherein the fingers form a raised surface to elevate the bridge to position the bridge to contact a selected region of the substrate.
16. The assembly of claim 13, wherein
    the fuel cell stack comprises flow plates adapted to extend between the fingers to contact the bridge.
17. The assembly of claim 16, wherein
    the flow plates form a channel to receive the frame.
18. The assembly of claim 16, wherein the flow plates comprise:
    first flow plates, each first flow plate including an edge to contact the bridge between two of the fingers; and
    second flow plates, each second flow plate forming a recessed region to receive one of the fingers.
19. The assembly of claim 18, wherein the first flow plates are interleaved with the second flow plates in the stack.
20. The assembly of claim 7, wherein
    the frame is adapted to mount to the stack.
21. The assembly of claim 7, wherein
    the frame is adapted to form a snap fit with the stack.
22. The assembly of claim 7, wherein the frame is adapted to compress the bridge against the substrate when the frame is mounted to the stack.
23. The assembly of claim 22, wherein the frame comprises:
    members to support the circuit board against a force exerted by the bridge when the bridge is compressed between the stack and the substrate.

24. The assembly of claim 7, wherein the frame comprises:
members to compress the bridge between the stack and the substrate.

25. The assembly of claim 7, wherein the frame comprises:
prongs to clip the bridge to the frame.

26. The assembly of claim 13, wherein the frame comprises:
a latch to lock the frame to the stack.

27. The assembly of claim 26, wherein the latch comprises:
a flexible member having a first position to permit engagement of the frame with the stack and a second position to lock the frame to the stack.

28. The assembly of claim 27, wherein the flexible member comprises:
a tab to contact the board to limit deflection of the flexible member.

29. The assembly of claim 1, wherein the substrate supports voltage monitoring circuitry.

30. An assembly comprising:
a fuel cell stack to provide cell voltages;
a circuit board; and
an elastomeric connector located between the fuel cell stack and the circuit board to contact the stack and the board to provide the cell voltages to the board.

31. The assembly of claim 31, further comprising:
a frame to position the elastomeric connector between the board and the stack.

32. The assembly of claim 32, wherein the frame holds the board.

33. The assembly of claim 32, wherein the frame holds the connector.

34. The assembly of claim 32, wherein the frame is adapted to mate with the stack.

35. The assembly of claim 32, wherein the fuel cell stack comprises:
flow plates adapted to mate with the frame.

36. The assembly of claim 36, wherein the flow plates are adapted to form a channel to receive the frame.

37. The assembly of claim 36, wherein
the fuel cell stack comprises flow plates,
the flow plates being associated with different fuel cells of the stack, and
the frame is adapted to cause the elastomeric connector to contact at least one flow plate associated with each cell and not contact at least one flow plate associated with each cell.

38. The assembly of claim 36, wherein the frame comprises:
fingers to extend at least partially around the elastomeric connector to hold the connector.

39. The assembly of claim 39, wherein
the fuel cell stack comprises flow plates adapted to extend between the fingers to contact the elastomeric connector.

40. The assembly of claim 39, wherein the frame is adapted to mount to the stack and compress the elastomeric connector against the circuit board when the frame is mounted to the stack.

41. A method comprising:
compressing an elastomeric connector between a fuel cell stack and a circuit board; and
using the elastomeric connector to communicate cell voltages of the fuel cell stack to the circuit board.

42. The method of claim 42, wherein the compressing comprises:
inserting the elastomeric connector into a frame; and
connecting the frame to the stack to compress the elastomeric connector against the board.

43. The method of claim 43, further comprising:
using the frame to hold the board.

44. The method of claim 42, further comprising:
shaping flow plates of the stack to mate with the frame.

45. The method of claim 44, wherein the shaping comprises:
forming a channel to receive the frame.

46. The method of claim 45, wherein the shaping comprises:
forming a channel to lock the frame to the stack.

47. A The method of claim 42, wherein the stack comprises flow plates associated with different cells of the stack, the method further comprising:
establishing a profile of the flow plates so that the frame contacts at least one flow plate associated with each cell and does not contact at least one flow plate associated with each cell.

48. An apparatus for providing cell voltages from a fuel cell stack to a circuit board, the apparatus comprising:
a compressible connector to provide indications of the cell voltages to the circuit board; and
a clamp to position the connector between the fuel cell stack and the circuit board.

49. The apparatus of claim 48, wherein the clamp is adapted to compress the compressible connector between the circuit board and the stack.

50. The apparatus of claim 49, wherein the compressible connector comprises an elastomeric connector.

* * * * *

UNITED STATES PATENT AND TRADEMARK OFFICE
CERTIFICATE OF CORRECTION

| | | |
|---|---|---|
| PATENT NO. | : 6,410,176 B1 | Page 1 of 1 |
| DATED | : June 25, 2002 | |
| INVENTOR(S) | : Suat Genc, Larry A. Pitts, Kevin L. Mease, Charles M. Carlstrom and Russel H. Marvin | |

It is certified that error appears in the above-identified patent and that said Letters Patent is hereby corrected as shown below:

Column 9,
Line 30, "claim 31" should be -- claim 30 --;
Line 33, "claim 32" should be -- claim 31 --;
Line 35, "claim 32" should be -- claim 31 --;
Line 37, "claim 32" should be -- claim 31 --;
Line 39, "claim 32" should be -- claim 31 --;
Line 42, "claim 36" should be -- claim 35 --;
Line 44, "claim 36" should be -- claim 35 --;

Column 10,
Line 1, "claim 36" should be -- claim 35 --;
Line 5, "claim 39" should be -- claim 38 --;
Line 9, "claim 39" should be -- claim 38 --;
Line 17, "claim 42" should be -- claim 41 --;
Line 22, "claim 43" should be -- claim 42 --;
Line 24, "claim 42" should be -- claim 41 --;
Line 29, "claim 45" should be -- claim 44 --;
Line 32, "cliam 42" should be -- claim 41 --;
Line 48, "claim 49" should be -- claim 48 --.

Signed and Sealed this

Twenty-fourth Day of December, 2002

JAMES E. ROGAN
*Director of the United States Patent and Trademark Office*